US011353866B2

(12) United States Patent
Obata et al.

(10) Patent No.: US 11,353,866 B2
(45) Date of Patent: Jun. 7, 2022

(54) DRIVING-AUTOMATION-LEVEL LOWERING FEASIBILITY DETERMINATION APPARATUS

(71) Applicant: MITSUBISHI ELECTRIC CORPORATION, Tokyo (JP)

(72) Inventors: Naohiko Obata, Tokyo (JP); Mitsuo Shimotani, Tokyo (JP); Tadashi Miyahara, Tokyo (JP); Yoshitaka Nakamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 432 days.

(21) Appl. No.: 16/315,046

(22) PCT Filed: Sep. 1, 2016

(86) PCT No.: PCT/JP2016/075669
§ 371 (c)(1),
(2) Date: Jan. 3, 2019

(87) PCT Pub. No.: WO2018/042592
PCT Pub. Date: Mar. 8, 2018

(65) Prior Publication Data
US 2019/0324451 A1  Oct. 24, 2019

(51) Int. Cl.
*G05D 1/00* (2006.01)
*B60W 40/04* (2006.01)
(Continued)

(52) U.S. Cl.
CPC ........... *G05D 1/0061* (2013.01); *B60W 40/04* (2013.01); *B60W 40/09* (2013.01); *B60W 50/14* (2013.01);
(Continued)

(58) Field of Classification Search
None
See application file for complete search history.

(56) References Cited

U.S. PATENT DOCUMENTS

2011/0118939 A1    5/2011  Kawamata et al.
2016/0033964 A1*   2/2016  Sato ........................ B60K 28/06
                                                               701/24
(Continued)

FOREIGN PATENT DOCUMENTS

CN      102067052 A      5/2011
CN      102700549 A      10/2012
(Continued)

OTHER PUBLICATIONS

"Yoji Miyazaki, System, method and program for retrieving vehicle to be followed, Jul. 1, 2010" (Year: 2010).*
(Continued)

*Primary Examiner* — Geepy Pe
*Assistant Examiner* — Bakari Underwood
(74) *Attorney, Agent, or Firm* — Birch, Stewart, Kolasch & Birch, LLP

(57) ABSTRACT

The present invention has an object of determining feasibility of lowering a driving automation level of an automated driving vehicle, based on a driving load considering a relationship with surrounding vehicles. An automatic-driving-level lowering feasibility determination apparatus according to the present invention includes: a surrounding vehicle information obtainment unit obtaining surrounding vehicle information; a driving load calculator calculating, based on the surrounding vehicle information, a driving load value indicating a magnitude of a driving load on the subject vehicle; a driving-automation-level lowering feasibility determination unit determining feasibility of lowering a driving automation level of the subject vehicle, based on the driving load value; and an output controller outputting, to an automated driving control device, a result of the feasibility determined by the driving-automation-level lowering feasibility determination unit.

8 Claims, 12 Drawing Sheets

(51) Int. Cl.
  *B60W 40/09*   (2012.01)
  *B60W 50/14*   (2020.01)
  *B60W 40/08*   (2012.01)

(52) U.S. Cl.
  CPC ............... *B60W 2040/0818* (2013.01); *B60W 2050/143* (2013.01); *G05D 2201/0213* (2013.01)

(56) References Cited

U.S. PATENT DOCUMENTS

| | | | |
|---|---|---|---|
| 2016/0221578 A1* | 8/2016 | Tang | ........................ F02D 28/00 |
| 2018/0046196 A1* | 2/2018 | Hashimoto | ..... B60W 30/18163 |
| 2019/0071101 A1* | 3/2019 | Emura | ..................... G08G 1/09 |

FOREIGN PATENT DOCUMENTS

| | | | |
|---|---|---|---|
| JP | 2007-196809 A | | 8/2007 |
| JP | 2010146428 A | * | 7/2010 |
| JP | 2016-34782 A | | 3/2016 |
| JP | 2016-45856 A | | 4/2016 |

OTHER PUBLICATIONS

International Search Report (PCT/ISA/210) issued in PCT/JP2016/075669, dated Nov. 22, 2016.
Office Action dated Jun. 29, 2021 in corresponding Chinese Application No. 201680088571.2 with an English Translation.
Office Action dated Mar. 16, 2022 in corresponding Chinese Application No. 201680088571.2 with an English Translation.

\* cited by examiner

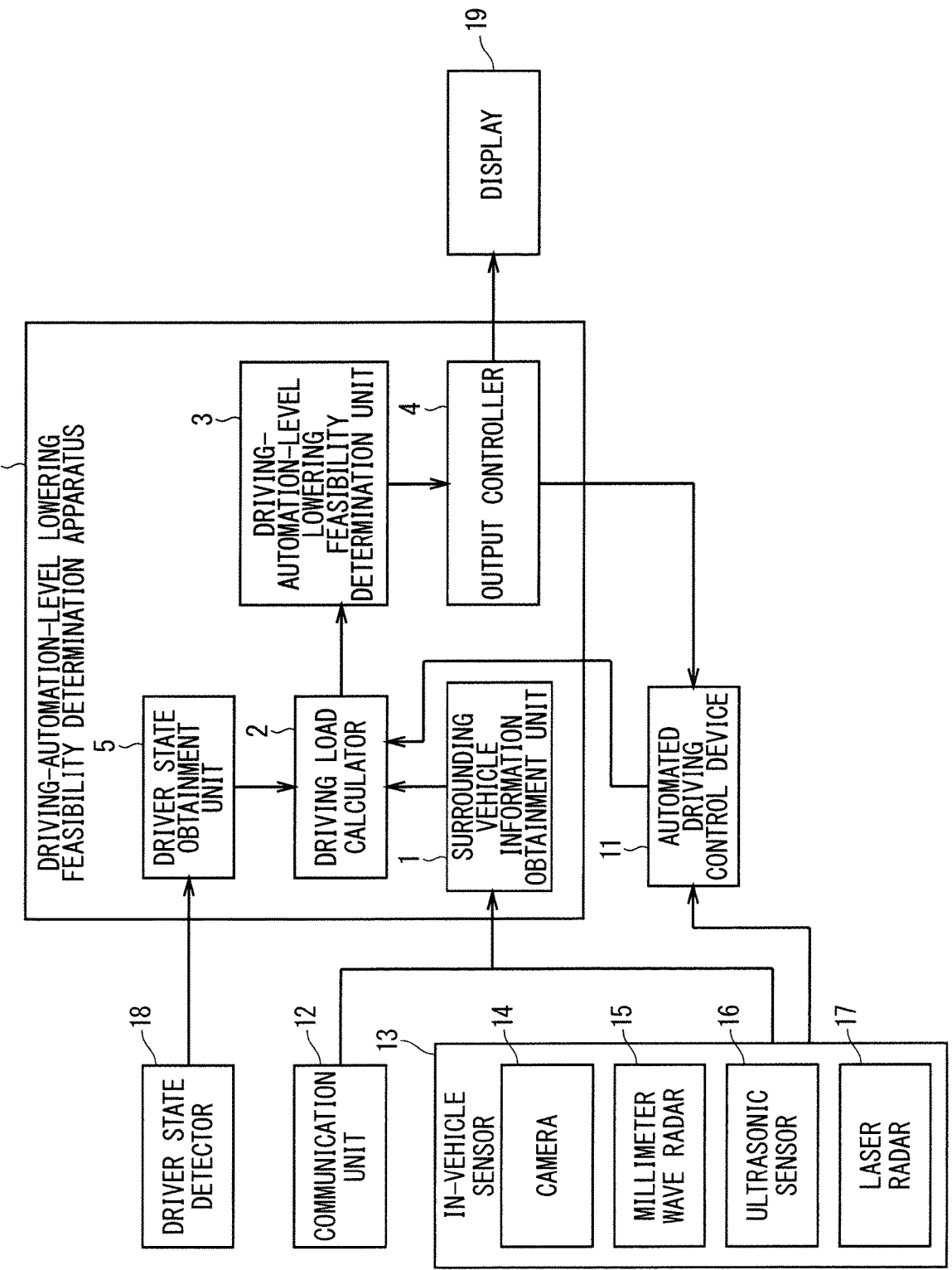
F I G. 3

DRIVING-AUTOMATION-LEVEL LOWERING FEASIBILITY DETERMINATION APPARATUS

TECHNICAL FIELD

The present invention relates to a technology for determining the feasibility of lowering a driving automation level of an automated driving vehicle in consideration of a driving load on a driver.

BACKGROUND ART

Automated driving systems for performing automated driving control of vehicles can lessen a driving load on a driver by controlling various actuators relating to traveling control. The Cabinet Office of Japan and the U.S. National Highway Traffic Safety Administration (NHTSA) currently define the driving automation levels as follows:

Level 0: the driver always operates all the main control systems of acceleration, steering, and braking, i.e., manual driving;

Level 1: a state where the system performs one of acceleration, steering, and braking;

Level 2: a state where the system performs a plurality of operations among acceleration, steering, and braking;

Level 3: the system performs all of acceleration, steering, and braking, and a driver performs the operations upon request from the system; and Level 4: all of acceleration, steering, and braking are performed by other than the driver, where the driver is not involved in any of these.

The present invention will be described based on these driving automation levels in the DESCRIPTION, which does not preclude the other driving automation levels.

Consideration is given to smooth authority transfer in the automated driving systems by making a change for lowering the driving automation level, that is, transferring the authority from the system to the driver while the driving load on the driver is small.

For example, Patent Document 1 discloses a vehicle control apparatus that determines whether a driver is in a state of accepting manual driving before switching a driving condition of a vehicle from automated driving to manual driving, and that sets a switching position to a position closer to the vehicle than a safe space on a route when determining that the driver is not in the state of accepting manual driving. This vehicle control apparatus can move the vehicle to the safe space when the driver cannot perform manual driving.

Patent Document 2 describes safe ending of automated driving by avoiding change from the automated driving to the manual driving in places, for example, a tunnel, a section with a grade, a merge point with the other roads, around a traffic light, an intersection, and a curve.

PRIOR ART DOCUMENTS

Patent Documents

Patent Document 1: Japanese Patent Application Laid-Open No. 2016-34782
Patent Document 2: Japanese Patent Application Laid-Open No. 2016-45856

SUMMARY

Problem to be Solved by the Invention

Although the prior art documents disclose determining whether to permit transferring the driving authority to the driver based on a state of the driver or characteristics of a traveling road, a relationship with surrounding vehicles has not yet been considered. Thus, even when there is no problem in a state of the driver or in characteristics of a traveling road, accepting a request for transferring the authority from the driver and transferring the authority to the driver are problematic in a situation where a driving load is high due to a relationship with surrounding vehicles, for example, the presence of a large number of the other vehicles around.

Considering such a problem, the object of the present invention is to determine the feasibility of lowering a driving automation level of an automated driving vehicle, based on a driving load in consideration of a relationship with surrounding vehicles.

Means to Solve the Problem

A driving-automation-level lowering feasibility determination apparatus according to the present invention includes: a surrounding vehicle information obtainment unit to obtain surrounding vehicle information that is information on a surrounding vehicle traveling around a subject vehicle in which an automated driving control device switches between a plurality of driving automation levels to perform automated driving control; a driving load calculator to calculate, based on the surrounding vehicle information, a driving load value indicating a magnitude of a driving load on the subject vehicle; a driving-automation-level lowering feasibility determination unit to determine feasibility of lowering one of the driving automation levels of the subject vehicle, based on the driving load value; and an output controller to output, to the automated driving control device, a result of the feasibility determined by the driving-automation-level lowering feasibility determination unit.

A driving-automation-level lowering feasibility determination method according to the present invention includes: obtaining surrounding vehicle information that is information on a surrounding vehicle traveling around a subject vehicle in which an automated driving control device switches between a plurality of driving automation levels to perform automated driving control; calculating, based on the surrounding vehicle information, a driving load value indicating a magnitude of a driving load on the subject vehicle; determining feasibility of lowering one of the driving automation levels of the subject vehicle, based on the driving load value; and outputting, to the automated driving control device, a result of the determined feasibility on lowering the one of the driving automation levels.

Effects of the Invention

The driving-automation-level lowering feasibility determination apparatus according to the present invention includes: a surrounding vehicle information obtainment unit to obtain surrounding vehicle information that is information on a surrounding vehicle traveling around a subject vehicle in which an automated driving control device switches between a plurality of driving automation levels to perform automated driving control; a driving load calculator to calculate, based on the surrounding vehicle information, a driving load value indicating a magnitude of a driving load on the subject vehicle; a driving-automation-level lowering feasibility determination unit to determine feasibility of lowering one of the driving automation levels of the subject vehicle, based on the driving load value; and an output controller to output, to the automated driving control device, a result of the feasibility determined by the driving-automation-level lowering feasibility determination unit. Thus, the feasibility of lowering a driving automation level of an automated driving vehicle can be determined based on a driving load in consideration of a relationship with surrounding vehicles.

The driving-automation-level lowering feasibility determination method according to the present invention includes: obtaining surrounding vehicle information that is information on a surrounding vehicle traveling around a subject vehicle in which an automated driving control device switches between a plurality of driving automation levels to perform automated driving control; calculating, based on the surrounding vehicle information, a driving load value indicating a magnitude of a driving load on the subject vehicle; determining feasibility of lowering one of the driving automation levels of the subject vehicle, based on the driving load value; and outputting, to the automated driving control device, a result of the determined feasibility on lowering the one of the driving automation levels. Thus, the feasibility of lowering a driving automation level of an automated driving vehicle can be determined based on a driving load in consideration of a relationship with surrounding vehicles.

The objects, features, aspects and advantages of the present invention will become more apparent from the following detailed description and the accompanying drawings.

BRIEF DESCRIPTION OF DRAWINGS

FIG. 3 is a block diagram illustrating a configuration of a driving-automation-level lowering feasibility determination apparatus according to Embodiment 2 of the present invention.

DESCRIPTION OF EMBODIMENTS

A. Embodiment 1

[A-1. Configuration]

Figure 1:
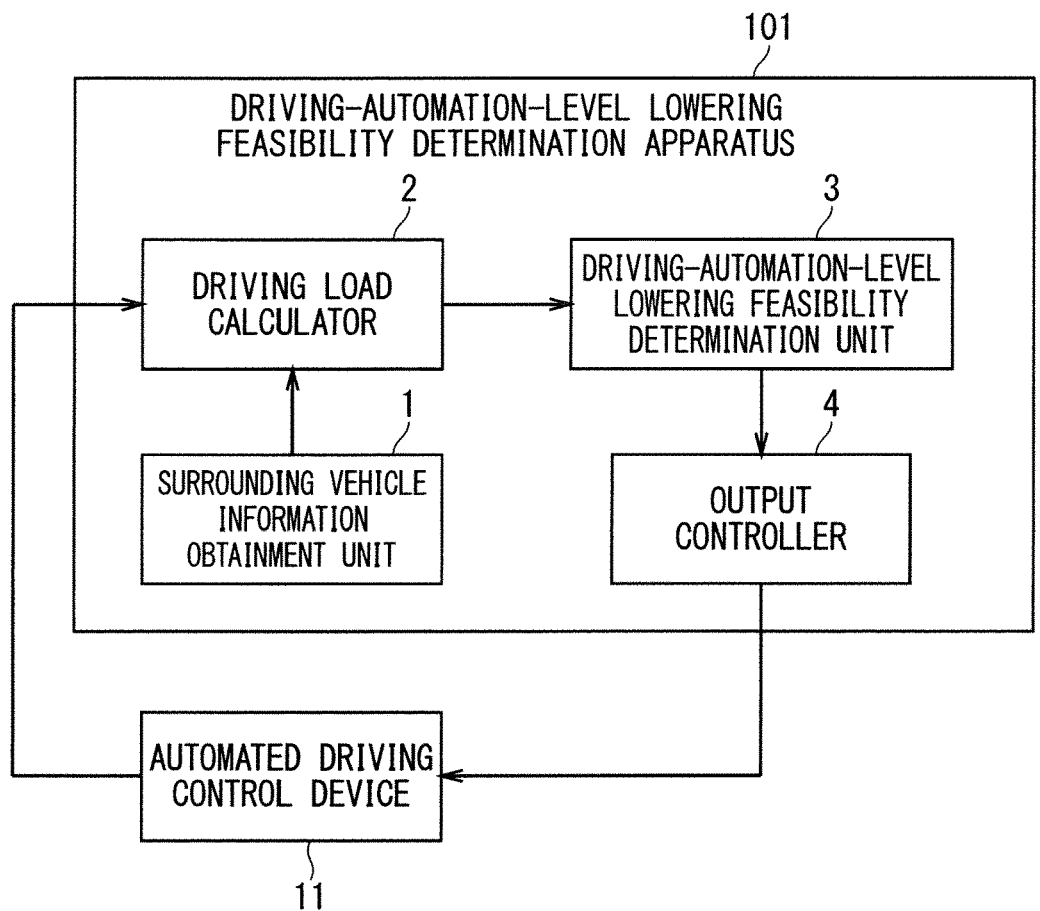
FIG. 1 is a block diagram illustrating a configuration of a driving-automation-level lowering feasibility determination apparatus according to Embodiment 1 of the present invention.

FIG. 1 is a block diagram illustrating a configuration of a driving-automation-level lowering feasibility determination apparatus 101 according to Embodiment 1 of the present invention. The driving-automation-level lowering feasibility determination apparatus 101 outputs, to an automated driving control device 11, a feasibility determination result on lowering the driving automation level. The automated driving control device 11 is a device that performs automated driving control of a vehicle, and can appropriately switch the driving automation level between Level 0 and Level 3.

Hereinafter, the vehicle to be controlled by the automated driving control device 11 will be referred to as a subject vehicle, and the other vehicles will be referred to as non-subject vehicles.

The driving-automation-level lowering feasibility determination apparatus 101 includes a surrounding vehicle information obtainment unit 1, a driving load calculator 2, a driving-automation-level lowering feasibility determination unit 3, and an output controller 4.

The surrounding vehicle information obtainment unit 1 obtains surrounding vehicle information that is information on surrounding vehicles. In DESCRIPTION, the non-subject vehicles traveling around the subject vehicle will be referred to as surrounding vehicles. The driving load calculator 2 calculates, based on the surrounding vehicle information, a driving load value indicating a magnitude of a driving load on the subject vehicle. The driving-automation-level lowering feasibility determination unit 3 determines the feasibility of lowering the driving automation level of the subject vehicle, based on the driving load value calculated by the driving load calculator 2. The output controller 4 outputs, to the automated driving control device 11, a feasibility determination result made by the driving-automation-level lowering feasibility determination unit 3. Upon receipt of the determination result indicating that the driving automation level can be lowered and upon an input of intention of lowering the driving automation level from the driver, the automated driving control device 11 switches the driving automation level to a lower level. Conversely, upon receipt of the determination result indicating that the driving automation level cannot be lowered, the automated driving control device 11 operates not to accept a request for switching the driving automation level from the driver. The lowering of a driving automation level will hereinafter imply switching the driving automation level to a lower level.

[A-2. Operations]

Figure 2:
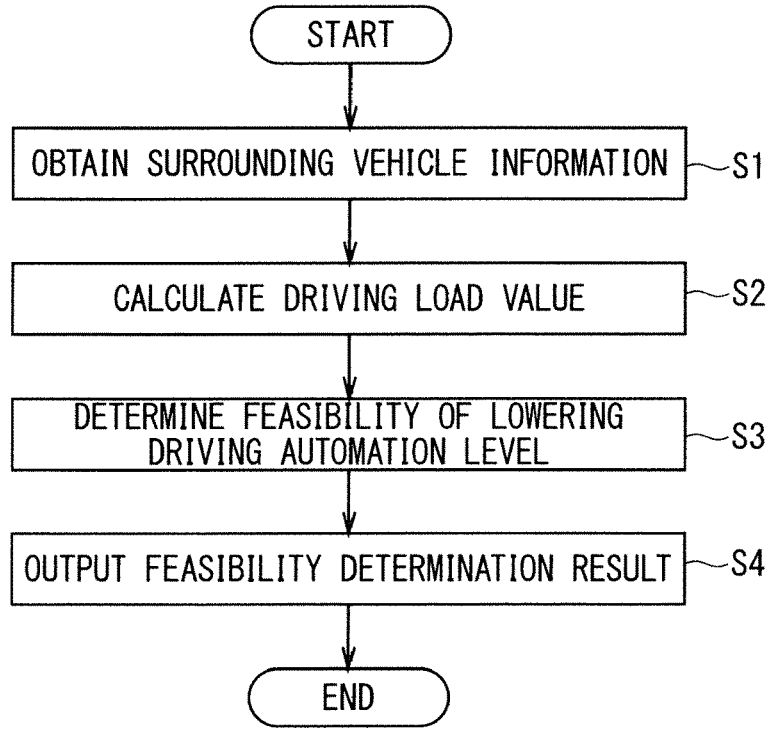
FIG. 2 is a flowchart indicating operations of the driving-automation-level lowering feasibility determination apparatus according to Embodiment 1 of the present invention.

FIG. 2 is a flowchart indicating operations of the driving-automation-level lowering feasibility determination apparatus 101 according to Embodiment 1 of the present invention.

The operations of the driving-automation-level lowering feasibility determination apparatus 101 will be described with reference to FIG. 2.

First, the surrounding vehicle information obtainment unit 1 obtains the surrounding vehicle information (Step S1). Next, the driving load calculator 2 calculates, based on the surrounding vehicle information, a driving load value indicating a magnitude of a driving load on the subject vehicle (Step S2). Then, the driving-automation-level lowering feasibility determination unit 3 determines the feasibility of lowering the driving automation level of the subject vehicle, based on the driving load value (Step S3). Subsequently, the output controller 4 outputs, to the automated driving control device 11, a feasibility determination result made by the driving-automation-level lowering feasibility determination unit 3 (Step S4).

[A-3. Advantages]

The driving-automation-level lowering feasibility determination apparatus 101 according to Embodiment 1 includes: the surrounding vehicle information obtainment unit 1 that obtains the surrounding vehicle information; the driving load calculator 2 that calculates, based on the surrounding vehicle information, a driving load value of the subject vehicle; the driving-automation-level lowering feasibility determination unit 3 that determines the feasibility of lowering the driving automation level of the subject vehicle, based on the driving load value; and the output controller 4 that outputs, to the automated driving control device 11, a result of the feasibility determined by the driving-automation-level lowering feasibility determination unit 3. Thus, the automated driving control device 11 lowers the driving automation level according to this determination result, so that the driving automation level can be lowered with the timing of a lower driving load in consideration of the surrounding vehicle information.

A driving-automation-level lowering feasibility determination method according to Embodiment 1 includes: obtaining the surrounding vehicle information; calculating, based on the surrounding vehicle information, a driving load value of the subject vehicle; determining the feasibility of lowering the driving automation level of the subject vehicle, based on the driving load value; and outputting, to the automated driving control device, a feasibility determination result on lowering the driving automation level. Thus, the automated driving control device 11 lowers the driving automation level according to this determination result, so that the driving automation level can be lowered with the timing of a lower driving load in consideration of the surrounding vehicle information.

B. Embodiment 2

[B-1. Configuration]

FIG. 3 is a block diagram illustrating a configuration of a driving-automation-level lowering feasibility determination apparatus 102 according to Embodiment 2 of the present invention. The driving-automation-level lowering feasibility determination apparatus 102 transmits and receives data to and from a driver state detector 18, a communication unit 12, an in-vehicle sensor 13, and a display 19, and is configured to make these available. Although FIG. 3 illustrates the communication unit 12, the in-vehicle sensor 13, the driver state detector 18, and the display 19 as configured outside the driving-automation-level lowering feasibility determination apparatus 102, these may be configured inside the driving-automation-level lowering feasibility determination apparatus 102.

The driving-automation-level lowering feasibility determination apparatus 102 will be hereinafter described as an in-vehicle apparatus mounted on the subject vehicle.

The communication unit 12 is mounted on the subject vehicle, and communicates with, for example, a communication unit mounted on a non-subject vehicle or a traffic information server.

The in-vehicle sensor 13 is a kind of a sensor mounted on the subject vehicle, and includes, for example, a camera 14, a millimeter wave radar 15, a ultrasonic sensor 16, and a laser radar 17. The in-vehicle sensor 13 detects absolute values of a traveling speed, a traveling direction, and a position of a surrounding vehicle, or relative values thereof with respect to the subject vehicle.

The driver state detector 18 is a device mounted on the subject vehicle, and detects a state of a driver of the subject vehicle such as an arousal level or a degree of concentration in driving. The driver state detector 18 includes, for example, electrodes in a steering wheel of the subject vehicle, and measures bio-information such as pulses or a body temperature of the driver and analyzes the bio-information to detect the arousal level of the driver. Alternatively, the driver state detector 18 includes a camera that captures an image of the driver, and analyzes the captured image to detect the arousal level of the driver from, for example, eye openness or the number of blinks. Alternatively, the driver state detector 18 measures the degree of concentration in driving from an operating state of an apparatus such as a smartphone.

The display 19 includes, for example, a liquid crystal display mounted on the subject vehicle. Alternatively, the display 19 may include a display of a mobile communication terminal such as a smartphone carried by the driver, other than such an in-vehicle display.

The automated driving control device 11 performs automated driving control of a vehicle according to a traveling plan. The automated driving control is performed by, specifically, outputting each controlled variable to a steering Electronic Control Unit (ECU), a driving ECU, and a braking ECU of the subject vehicle. When, for example, a destination of the subject vehicle is set, the automated driving control device 11 generates, in advance, a traveling route, a traveling lane, a traveling speed, etc., of the vehicle up to the destination as a traveling plan from the map data stored in a map database that is not illustrated in FIG. 3. This map database may be possessed by the automated driving control device 11 or stored in an external server accessible by the automated driving control device 11. The automated driving control device 11 corrects the traveling plan generated from the map data, based on measurement information of the in-vehicle sensor 13 at any time.

The driving-automation-level lowering feasibility determination apparatus 102 includes a driver state obtainment unit 5 that obtains a state of the driver of the subject vehicle, in addition to the configuration of the driving-automation-level lowering feasibility determination apparatus 101 illustrated in FIG. 1. The driver state obtainment unit 5 obtains a state of the driver such as the arousal level or the degree of concentration in driving from the driver state detector 18.

[B-2. Operations]

Next, processes for determining the driving-automation-level lowering feasibility by the driving-automation-level lowering feasibility determination apparatus 102 will be described according to the flowchart in FIG. 4. The driving load calculator 2 of the driving-automation-level lowering feasibility determination apparatus 102 obtains, from the automated driving control device 11, the traveling plan, the driving automation level defined for each section of a traveling route in the traveling plan, and behaviors of the subject vehicle at any time, for example, at fixed time intervals. The driving automation levels may be defined according to the traveling plan. FIG. 5 is a conceptual diagram in which the driving automation level is defined for each section of a traveling route. Here, the traveling plan for traveling past points P0 to P6 illustrated in FIG. 5 is made. Sections from the points P0 to P6 are defined as sections to be traveled at the driving automation level 3. A section after the point P6 is defined as a section to be traveled at the driving automation level 2. Unless the driver requests the automated driving control device 11 to switch the driving automation level, the driving automation level is switched from the level 3 to the level 2 when the subject vehicle passes the point P6. This point P6 will be referred to as a driving-automation-level lowered point.

Here, the automated driving control device 11 sets, to the point P1, a point traced back from the driving-automation-level lowered point P6 by a fixed distance or by a distance traveled by the subject vehicle for a fixed period of time along the traveling route. The automated driving control device 11 sets a section from the points P0 to P1 to a driving intervention disabling section X, and sets a section from the points P1 to P6 to an authority transfer preparing section Y. The driving intervention disabling section X is a section in which the driving automation level will not be lowered even upon receipt of a request for lowering the driving automation level from the driver. The authority transfer preparing section Y is a section in which the driving automation level can be lowered in response to the request from the driver. In other words, the driver may wait for the driving-automation-level lowered point P6 at which the driving automation level is switched, or switch the driving automation level with his/her own timing in the authority transfer preparing section Y.

Figure 6:
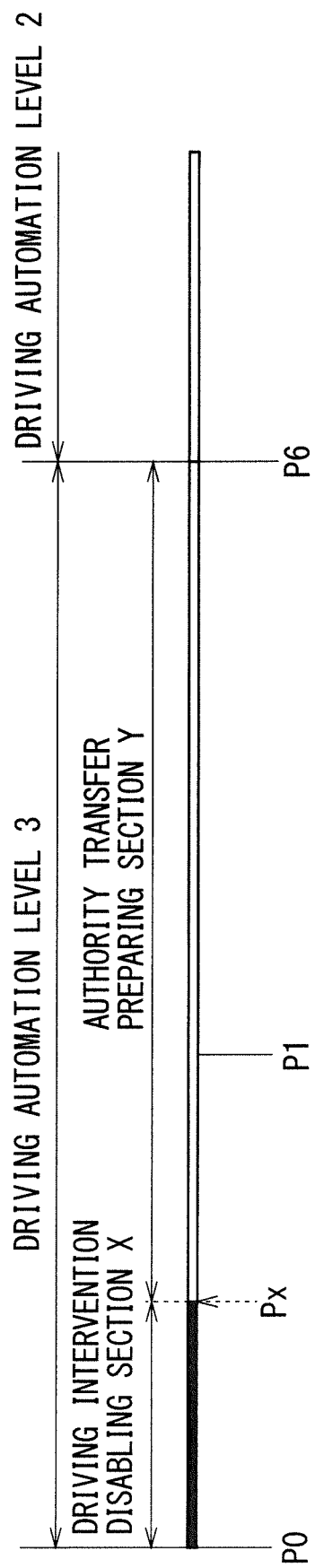
FIG. 6 is a conceptual diagram in which a driving automation level is defined for each section of a traveling route.

Although the authority transfer preparing section Y is defined as a section at a fixed distance from the driving-automation-level lowered point P6 in the description above, it may be defined upon request for lowering the driving automation level from the driver. In other words, upon receipt of the request for lowering the driving automation level from the driver before the subject vehicle reaches the point P1, the automated driving control device 11 sets a point at which the vehicle is traveling at the time to a point Px, and sets a section from the point Px to the point P6 to the authority transfer preparing section Y as illustrated in FIG. 6. Consequently, the driver can cause the driving-automation-level lowering feasibility determination apparatus 102 to perform the processes for determining the driving-automation-level lowering feasibility to be described later by requesting the automated driving control device 11 to lower the driving automation level with his/her desired timing, irrespective of no matter how far the point at which the subject vehicle is traveling is from the driving-automation-level lowered point P6.

When the subject vehicle reaches the point P1, that is, the authority transfer preparing section Y, the automated driving control device 11 broadcasts the arrival to the driving-automation-level lowering feasibility determination apparatus 102. Then, the driving-automation-level lowering feasibility determination apparatus 102 starts the processes for determining the driving-automation-level lowering feasibility.

Figure 4:
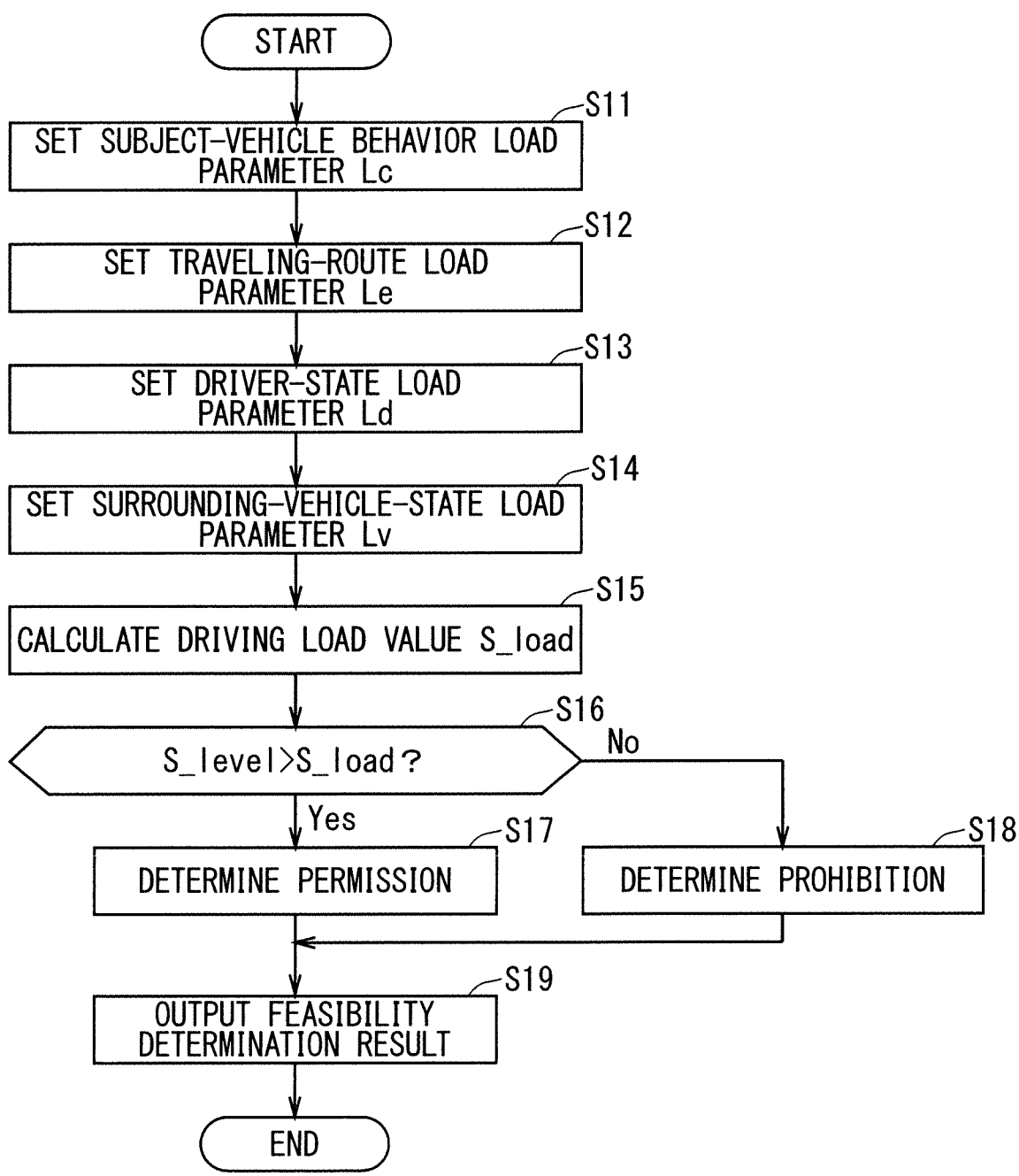
FIG. 4 is a flowchart indicating operations of the driving-automation-level lowering feasibility determination apparatus according to Embodiment 2 of the present invention.
Figure 5:
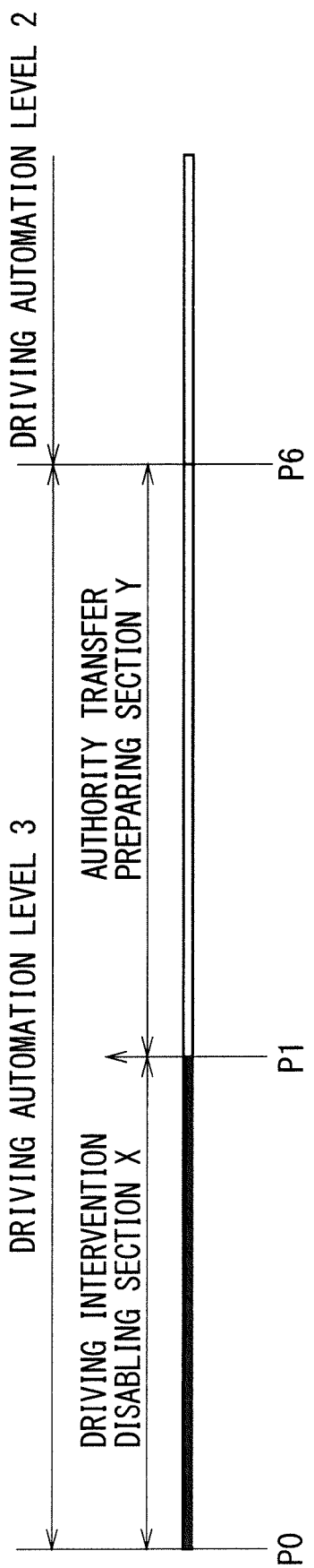
FIG. 5 is a conceptual diagram in which a driving automation level is defined for each section of a traveling route.

In FIG. 4, first, the driving load calculator 2 sets a subject-vehicle behavior load parameter Lc (Step S11). The subject-vehicle behavior load parameter Lc is a parameter relating to a behavior of the subject vehicle among parameters of driving load values. The driving load calculator 2 sets the subject-vehicle behavior load parameter Lc based on the latest behavior of the subject vehicle obtained from the automated driving control device 11. The subject-vehicle behavior load parameter Lc is a parameter relating to a behavior of the subject vehicle, such as speed, lane change, sudden acceleration, sudden deceleration of the subject vehicle, or overtaking a non-subject vehicle by the subject vehicle. The driving load calculator 2 sets the subject-vehicle behavior load parameter Lc so that, for example, the driving load value when the subject vehicle is traveling at high speeds is more increased than that when traveling at low speeds. The driving load calculator 2 also sets the subject-vehicle behavior load parameter Lc so that the driving load value when the subject vehicle is overtaking a non-subject vehicle is more increased than otherwise.

Next, the driving load calculator 2 sets a traveling-route load parameter Le (Step S12). The traveling-route load parameter Le is a parameter relating to characteristics on a traveling route among the parameters of the driving load values. The driving load calculator 2 sets the traveling-route load parameter Le based on characteristics on the current traveling route of the subject vehicle. The manual driving requires more attention to operate the steering wheel in curving than in traveling straight. Since traveling through a tunnel narrows a field of view, more attention is required for driving operations than in traveling along a normal road. Thus, the driving load calculator 2 sets the subject-vehicle behavior load parameter Lc so that the driving load value in traveling through a special point or a section such as a curve or a tunnel is more increased than otherwise. The driving load calculator 2 can obtain the characteristics on the traveling route, with reference to the position information of the subject vehicle entered from the automated driving control device 11 at any time and the map data that is not illustrated. Alternatively, the driving load calculator 2 may obtain the characteristics on the traveling route directly from the automated driving control device 11.

Next, the driving load calculator 2 sets a driver-state load parameter Ld (Step S13). The driver-state load parameter Ld is a parameter relating to a state of the driver among the parameters of the driving load values. Here, after the driver state obtainment unit 5 obtains a state of the driver of the subject vehicle from the driver state detector 18, the driving load calculator 2 sets the driver-state load parameter Ld based on the state of the driver. Upon acquisition of the driving authority while the arousal level of the driver is low or the degree of concentration in driving is low such as inattentive driving of the driver, the driver is not psychologically or physiologically in good condition for driving. Thus, the driver cannot drive the vehicle smoothly sometimes. Thus, the driving load calculator 2 sets the driver-state load parameter Ld so that the driving load value when the arousal level of the driver is low or the degree of concentration in driving is low is more increased than otherwise.

Next, the driving load calculator 2 sets a surrounding-vehicle-state load parameter Lv (Step S14). The surrounding-vehicle-state load parameter Lv is a parameter relating to a state of a surrounding vehicle among the parameters of the driving load values. Here, after the surrounding vehicle information obtainment unit 1 obtains the surrounding vehicle information from the in-vehicle sensor 13 or the communication unit 12, the driving load calculator 2 sets the surrounding-vehicle-state load parameter Lv based on the surrounding vehicle information.

Figure 7:
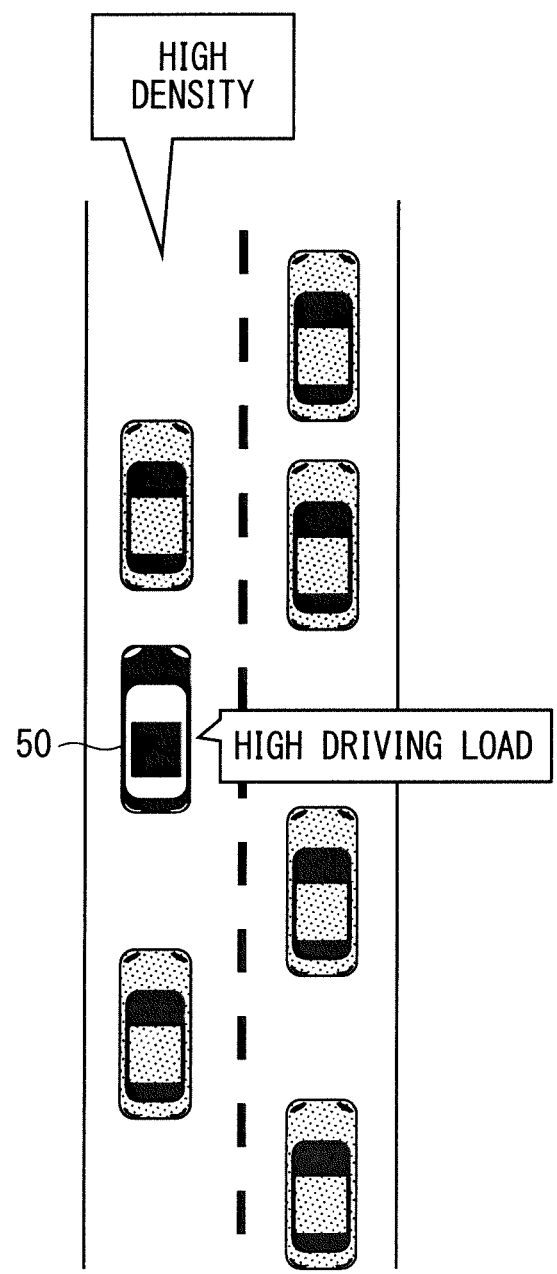
FIG. 7 illustrates an example of surrounding vehicles affecting a driving load on a subject vehicle.
Figure 8:
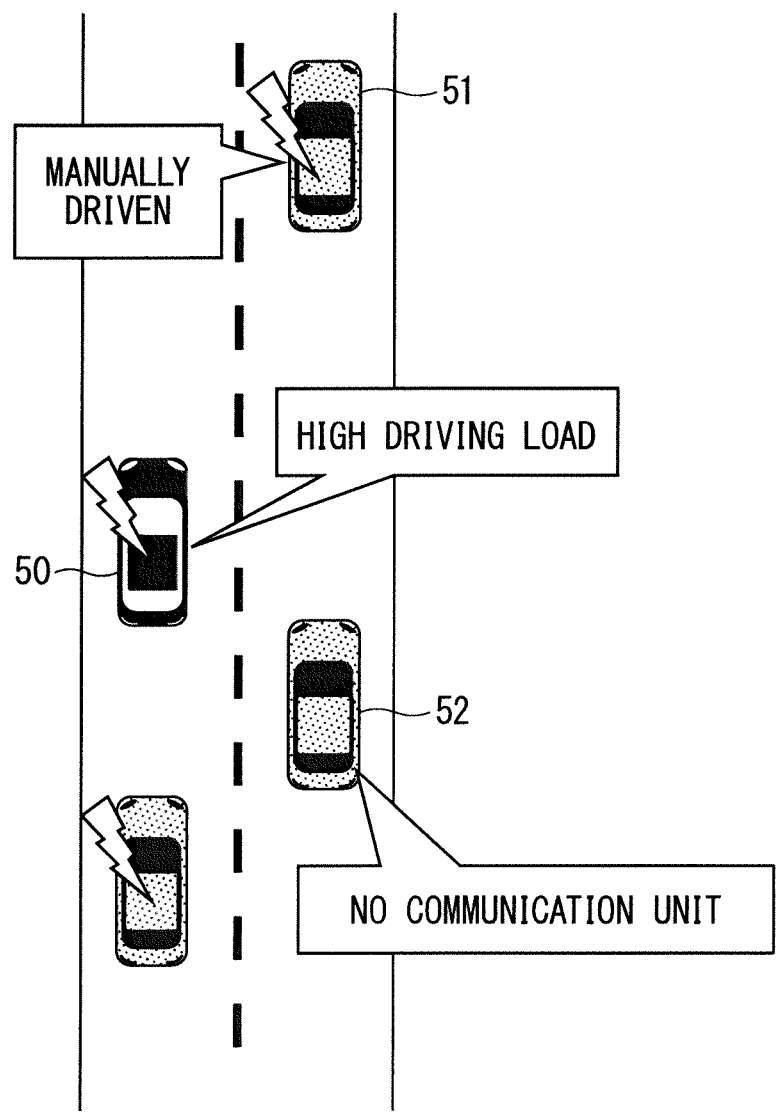
FIG. 8 illustrates an example of surrounding vehicles affecting the driving load on the subject vehicle.
Figure 9:
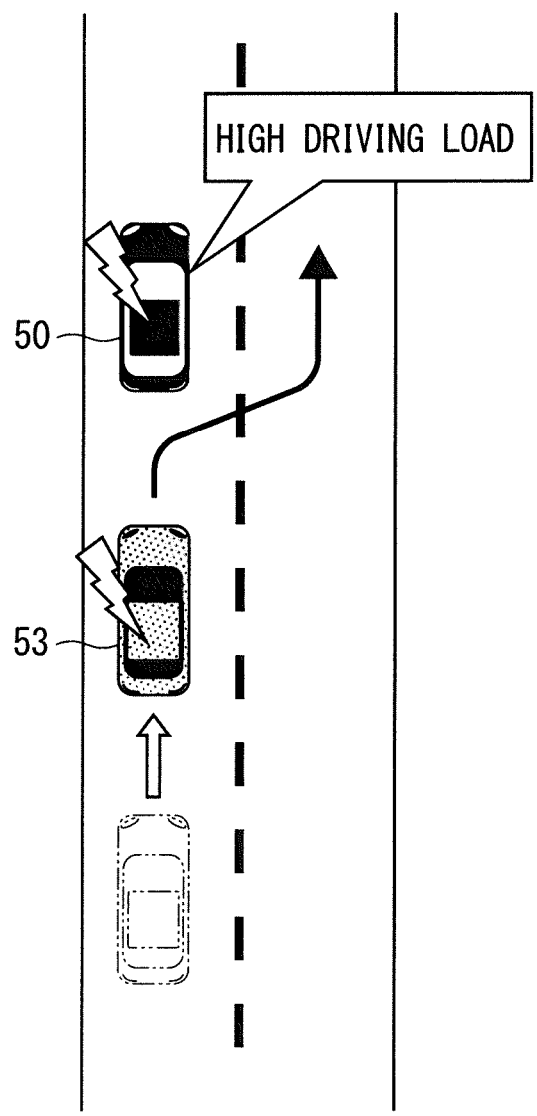
FIG. 9 illustrates an example of surrounding vehicles affecting the driving load on the subject vehicle.

FIGS. 7, 8, and 9 illustrate examples of surrounding vehicles affecting the driving load on the subject vehicle. FIG. 7 illustrates the presence of many surrounding vehicles around a subject vehicle 50, which indicates a state where the density of the surrounding vehicles is high. The driving load calculator 2 sets the surrounding-vehicle-state load parameter Lv so that the driving load value when the density of the surrounding vehicles is high is more increased than that when the density of the surrounding vehicles is low. The surrounding vehicle information obtainment unit 1 may obtain the density of the surrounding vehicles from the communication unit 12. Alternatively, the surrounding vehicle information obtainment unit 1 may obtain distances between the subject vehicle and the surrounding vehicles from the in-vehicle sensor 13 and define the density according to the number of the surrounding vehicles located within a fixed distance, for example, 100 m.

FIG. 8 illustrates a state where a surrounding vehicle 51 traveling ahead of the subject vehicle 50 is being manually driven and no communication unit is mounted on a surrounding vehicle 52 traveling right behind the subject vehicle. The driving load calculator 2 sets the surrounding-vehicle-state load parameter Lv so that the driving load value in the presence of the surrounding vehicle being manually driven is more increased than otherwise. This reflects that the automated driving vehicle has less sudden movement and is safer than the manual driving vehicle. The driving load calculator 2 sets the surrounding-vehicle-state load parameter Lv so that the driving load value in the presence of the surrounding vehicle on which the communication unit 12 is not mounted is more increased than otherwise. This reflects the possibility of coordinated driving with a vehicle on which the communication unit 12 is mounted via inter-vehicle communications or a state where the driving load decreases more upon obtainment of the state of the vehicle. The surrounding vehicle information obtainment unit 1 can obtain the driving automation level of a surrounding vehicle and the presence or absence of the communication unit, via inter-vehicle communications with the surrounding vehicle using the communication unit 12. FIG. 9 will be described later.

Figure 10:
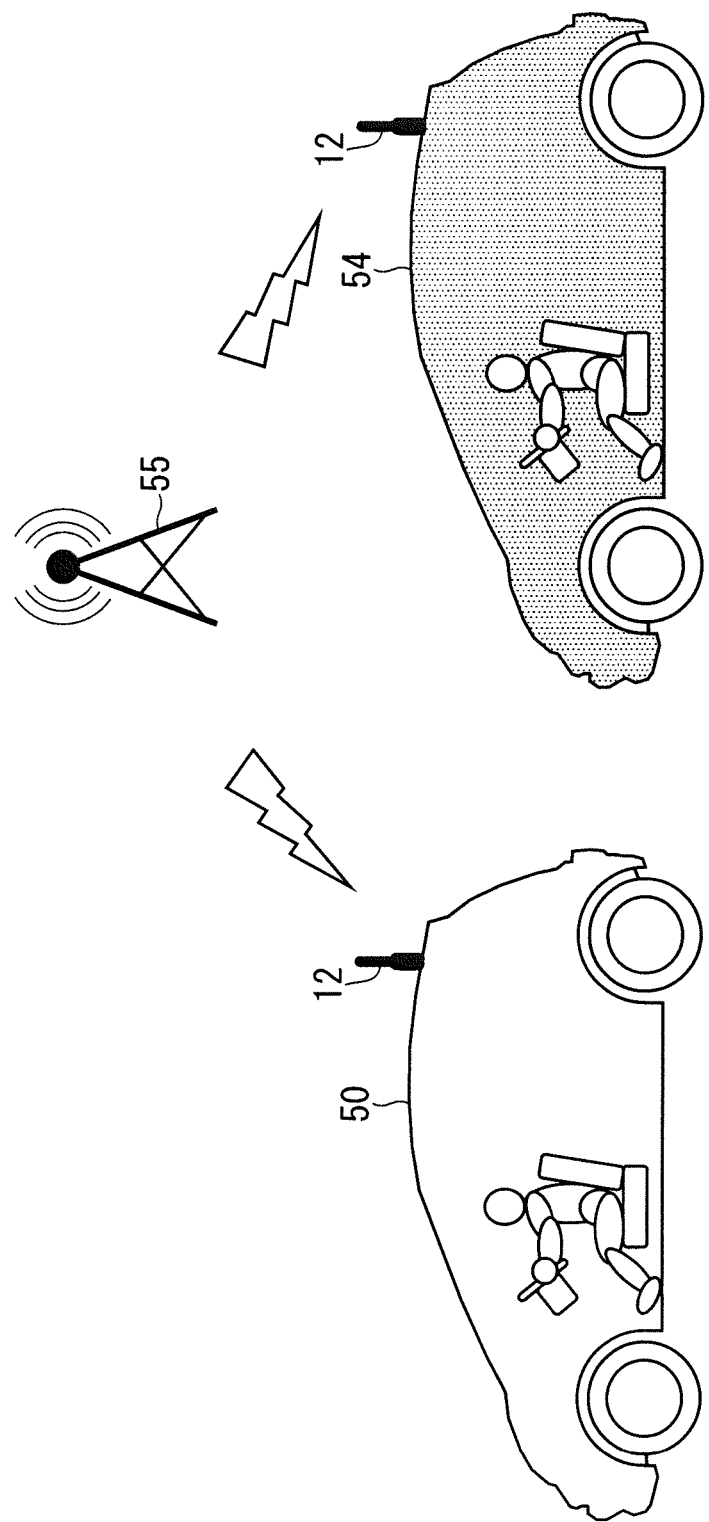
FIG. 10 is a conceptual diagram in which a surrounding vehicle information obtainment unit obtains surrounding vehicle information via a communication unit.

FIG. 10 is a conceptual diagram in which the surrounding vehicle information is communicated, via the communication units 12, between the subject vehicle 50 and a surrounding vehicle 54 traveling behind the subject vehicle 50. The subject vehicle 50 and the surrounding vehicle 54 may directly perform wireless communication via the communication units 12. Alternatively, each of the vehicles may store its own surrounding vehicle information in a server 55 via the communication unit 12, and the subject vehicle 50 may obtain the surrounding vehicle information from the server 55.

Upon detection of the surrounding vehicle 54 from the in-vehicle sensor 13, the surrounding vehicle information obtainment unit 1 attempts to obtain the surrounding vehicle information of the surrounding vehicle 54 via the communication unit 12. For example, the surrounding vehicle information obtainment unit 1 determines that the communication unit 12 is not mounted on the surrounding vehicle 54 when the wireless communication is not established with the surrounding vehicle via the communication unit 12 or when the server 55 does not store the surrounding vehicle information of the surrounding vehicle 54.

The surrounding vehicle information includes attribute information of the driver of the surrounding vehicle. The attribute information of the driver includes at least one of the age, a driving history, and a driving record of the driver. Examples of the driving record include records of dangerous driving such as sudden acceleration, sudden deceleration, and sudden steering, accident records, warning records on inattentive driving, and warning records on drowsy driving. The lower the driving automation level of the surrounding vehicle is, the more probably the surrounding vehicle exhibits unpredictable behavior for the subject vehicle. Thus, the driving load calculator 2 sets the surrounding-vehicle-state load parameter Lv so that the driving load value is more increased as the driving automation level of the surrounding vehicles is lower. Similarly, the driving load calculator 2 sets the surrounding-vehicle-state load parameter Lv so that the driving load value is more increased as the driver is older, so that the driving load value is more increased as the driving history is shorter, so that the driving load value is more increased as the frequency of sudden acceleration and deceleration is higher, so that the driving load value is more increased as the accident records are higher in number, and so that the driving load value in drowsy driving or inattentive driving is more increased than otherwise.

FIG. 9 illustrates a state where a surrounding vehicle 53 traveling behind the subject vehicle 50 is overtaking the subject vehicle. The driving load calculator 2 sets the surrounding-vehicle-state load parameter Lv so that the driving load value when the surrounding vehicle 53 exhibits peculiar behavior such as overtaking the subject vehicle 50 is more increased than otherwise. In other words, the surrounding vehicle information includes the presence or absence of the peculiar behavior of the surrounding vehicle. The surrounding vehicle information obtainment unit 1 can obtain a distance between the surrounding vehicle 53 and the subject vehicle 50 at any time, for example, at fixed time intervals from the in-vehicle sensor 13, and determine that the surrounding vehicle 53 is overtaking the subject vehicle when the distance is suddenly reduced. Alternatively, the surrounding vehicle information obtainment unit 1 can determine that the surrounding vehicle 53 is overtaking the subject vehicle when determining that the blinker of the surrounding vehicle 53 is blinking, from the image behind the subject vehicle 50 that has been captured by the camera 14. The surrounding vehicle information obtainment unit 1 may obtain the presence or absence of the peculiar behavior of the surrounding vehicle 53 from the communication unit 12 via inter-vehicle communications with the surrounding vehicle 53.

The surrounding vehicle information obtainment unit 1 may obtain a vehicle type of the surrounding vehicle 53 from the communication unit 12. Then, the driving load calculator 2 may set the surrounding-vehicle-state load parameter Lv so that the driving load value when the vehicle type of the surrounding vehicle is different from that of the subject vehicle is more increased than otherwise. In other words, the surrounding vehicle information includes the vehicle type of the surrounding vehicle.

Thus, the surrounding vehicle information includes at least one of the density of the surrounding vehicles, the behavior of the surrounding vehicle, the presence or absence of the automated driving function of the surrounding vehicle, the driving automation level of the surrounding vehicle, the presence or absence of the communication unit of the surrounding vehicle, the vehicle type of the surrounding vehicle, and the attribute information of the driver of the surrounding vehicle.

A method for setting the surrounding-vehicle-state load parameter Lv is described above. With reference back to the flowchart in FIG. 4, the driving load calculator 2 then calculates a driving load value S_load based on the various parameters Lc, Le, Ld, and Lv set in Steps S11 to S14 (Step S15). The driving load value S_load is a function using, as parameters, the subject-vehicle behavior load parameter Lc, the traveling-route load parameter Le, the driver-state load parameter Ld, and the surrounding-vehicle-state load parameter Lv, and is expressed by the following equation:

$$S\_load = \alpha c \times Lc + \alpha e \times Le + \alpha d \times Ld + \alpha v \times Lv.$$

Here, αc, αe, αd, and αv are appropriate coefficients. This equation is one example, and another equation such as an exponential function may be used.

Next, the output controller 4 compares the driving load value S_load with a predetermined threshold S_level, and determines whether the driving load value S_load is smaller than the predetermined threshold S_level (Step S16). When the driving load value S_load is smaller than the predetermined threshold S_level, the output controller 4 determines to permit lowering the driving automation level (Step S17). When the driving load value S_load is not smaller than the predetermined threshold S_level, the output controller 4 determines prohibition of lowering the driving automation level (Step S18). Then, the output controller 4 outputs a feasibility determination result on lowering the driving automation level to the automated driving control device 11 and the display 19 (Step S19). The processes for determining the driving-automation-level lowering feasibility by the driving-automation-level lowering feasibility determination apparatus 102 end herein.

Figure 11:
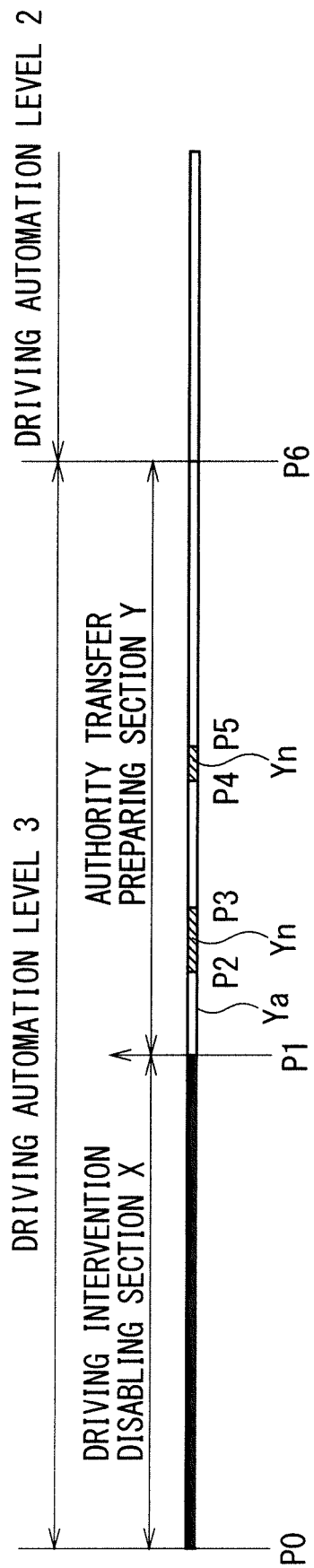
FIG. 11 illustrates driving-automation-level switching possible sections and driving-automation-level switching prohibition sections.

The driving-automation-level lowering feasibility determination apparatus 102 repeats the processes for determining the switching feasibility from Steps S11 to S19 described above while the subject vehicle is traveling in the authority transfer preparing section Y. Thus, the feasibility determination on switching for lowering the driving automation level is updated according to a state of the surrounding vehicles that varies from moment to moment while the subject vehicle is traveling in the authority transfer preparing section Y. FIG. 11 illustrates, in the authority transfer preparing section Y of the traveling route of the subject vehicle illustrated in FIG. 5, a result of the determination made by the driving-automation-level lowering feasibility determination apparatus 102. As illustrated in FIG. 11, each of a section from points P2 to P3 and a section from points P4 to P5 in the authority transfer preparing section Y is a driving-automation-level switching prohibition section Yn in which the automatic-driving-level lowering feasibility determination apparatus 102 prohibits lowering the driving automation level. The rest of the authority transfer preparing section Y consists of driving-automation-level switching permission sections Ya in which the driving-automation-level lowering feasibility determination apparatus 102 permits lowering the driving automation level.

Figure 12:
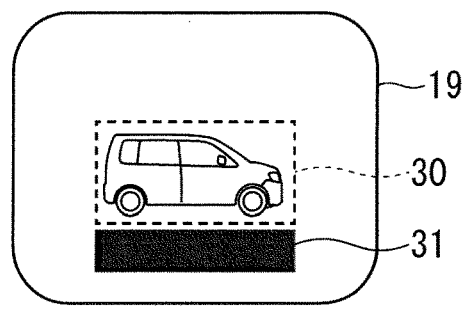
FIG. 12 illustrates a display example of a driving-automation-level lowering feasibility determination result.
Figure 13:
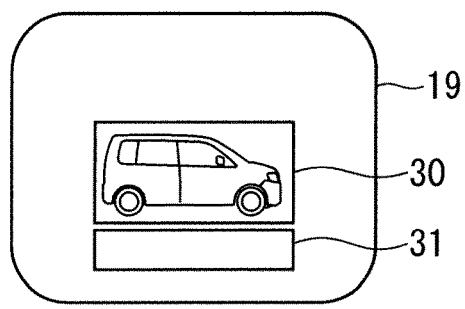
FIG. 13 illustrates a display example of a driving-automation-level lowering feasibility determination result.
Figure 14:
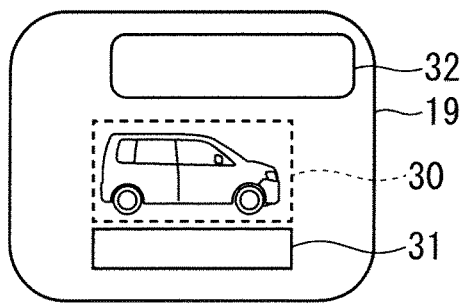
FIG. 14 illustrates a display example of a driving-automation-level lowering feasibility determination result.

FIGS. 12, 13, and 14 illustrate display examples on the display 19 in the driving intervention disabling section X, the driving-automation-level switching permission sections Ya, and the driving-automation-level switching prohibition sections Yn illustrated in FIG. 11, respectively. While the subject vehicle is traveling in the driving intervention disabling section X, a subject vehicle icon 30 and a bar 31 are displayed on the display 19 as illustrated in FIG. 12. A frame of the subject vehicle icon 30 is displayed in dotted line, which indicates that the driving automation level cannot be lowered. The bar 31 is displayed in black, which indicates that the subject vehicle is traveling in the driving intervention disabling section X.

The display colors of the frame of the subject vehicle icon 30 and the bar 31 are changed for each section. As illustrated in FIG. 13, the frame of the subject vehicle icon 30 is displayed in solid line while the subject vehicle is traveling in the driving-automation-level switching permission sections Ya, which indicates that the driving automation level can be lowered. The bar 31 is displayed in white, which indicates that the subject vehicle is traveling in the authority transfer preparing section Y.

As illustrated in FIG. 14, the frame of the subject vehicle icon is displayed in dotted line while the subject vehicle is traveling in the driving-automation-level switching prohibition sections Yn, which indicates that the driving automation level cannot be lowered. The bar 31 is displayed in white, which indicates that the subject vehicle is traveling in the authority transfer preparing section Y. A message 32 indicating a reason why the driving automation level cannot be lowered, for example, "FOLLOWING VEHICLE IS OVERTAKING" may be displayed on the display 19.

The driver instructs the automated driving control device 11 to lower the driving automation level when the frame of the subject vehicle icon 30 is displayed in solid line, thus enabling lowering of the driving automation level with the timing with less driving load in consideration of the surrounding vehicles.

[B-3. Modifications]

Although FIGS. 12, 13, and 14 illustrate display methods as examples of a method for presenting, to the driver, the feasibility determination result on lowering the driving automation level, the result may be presented to the driver in voice as a replacement for the displays. The voice is output from a speaker installed in a vehicle or a speaker of a mobile communication terminal such as a smartphone. For example, the output controller 4 causes the speaker to output voice saying "driving automation level cannot be lowered" while the subject vehicle is traveling in the driving-automation-level switching prohibition section Yn, and causes the speaker to output voice saying "driving automation level can be lowered" while the subject vehicle is traveling in the driving-automation-level switching permission section Ya. The output controller 4 may present the feasibility determination result on lowering the driving automation level to the driver with display and voice in combination, and further in combination of these with another method such as vibration.

In the description above, the driving load calculator 2 calculates the driving load value S_load based on the subject-vehicle behavior load parameter Lc, the traveling-route load parameter Le, the driver-state load parameter Ld, and the surrounding-vehicle-state load parameter Lv. However, the driving load value S_load may be calculated based on at least the surrounding-vehicle-state load parameter Lv. The driving load calculator 2 may calculate a driving load value based on the surrounding-vehicle-state load parameter Lv, and at least one of the subject-vehicle behavior load parameter Lc, the traveling-route load parameter Le, and the driver-state load parameter Ld.

C. Hardware Configuration

Figure 15:
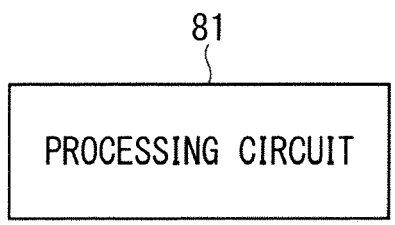
FIG. 15 illustrates a hardware configuration of the driving-automation-level lowering feasibility determination apparatus according to the present invention.

The surrounding vehicle information obtainment unit 1, the driving load calculator 2, the driving-automation-level lowering feasibility determination unit 3, the output controller 4, and the driver state obtainment unit 5 in the driving-automation-level lowering feasibility determination apparatuses 101 and 102 are implemented by a processing circuit 81 illustrated in FIG. 15. In other words, the processing circuit 81 includes the surrounding vehicle information obtainment unit 1, the driving load calculator 2, the driving-automation-level lowering feasibility determination unit 3, the output controller 4, and the driver state obtainment unit 5. The processing circuit 81 may be dedicated hardware, or a processor that executes a program stored in a memory. The processor is, for example, a central processing unit, a processing unit, an arithmetic unit, a microprocessor, a microcomputer, or a Digital Signal Processor.

When the processing circuit 81 is dedicated hardware, it corresponds to, for example, a single circuit, a composite circuit, a programmed processor, a parallel-programmed processor, an Application Specific Integrated Circuit (ASIC), a Field-Programmable Gate Array (FPGA), or any combinations thereof. The functions of each of the units, for example, the driving load calculator 2 may be implemented by a plurality of processing circuits 81, or the functions of the units may be collectively implemented by a single processing circuit.

Figure 16:
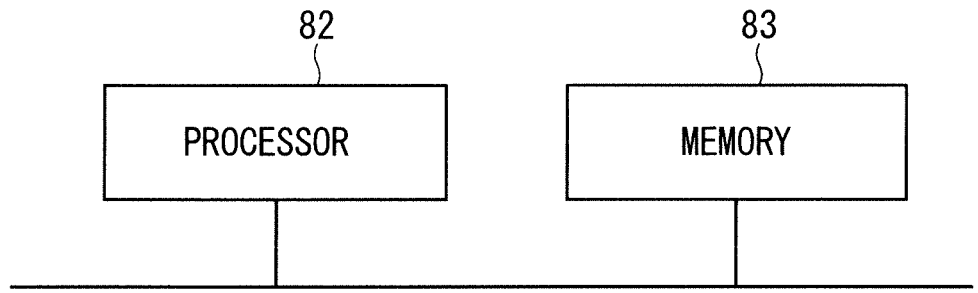
FIG. 16 illustrates a hardware configuration of the driving-automation-level lowering feasibility determination apparatus according to the present invention.

When the processing circuit 81 is a processor, the functions of the driving load calculator 2, etc. are implemented by any combinations with software, etc (software, firmware, or the software and the firmware). For example, the software is described as a program, and stored in a memory. As illustrated in FIG. 16, a processor 82 corresponding to the processing circuit 81 implements the functions of each of the units by reading and executing the program stored in a memory 83. In other words, each of the driving-automation-level lowering feasibility determination apparatuses 101 and 102 includes the memory 83 for storing a program which, when executed by the processing circuit 81, consequently executes the steps of: obtaining surrounding vehicle information; calculating, based on the surrounding vehicle information, a driving load value of a subject vehicle; determining feasibility of lowering a driving automation level of the subject vehicle, based on the driving load value; and outputting, to the automated driving control device 11, a feasibility determination result on lowering the driving automation level. Put it differently, this program causes a computer to execute the procedure or the method for the driving load calculator 2, etc. Here for example, at least one of a non-volatile or volatile semiconductor memory such as a random-access memory (RAM), a read-only memory (ROM), a flash memory, an electrically programmable read-only memory (EPROM), or an electrically erasable programmable read-only memory (EEPROM), a hard disk drive (HDD), a magnetic disk, a flexible disk, an optical disk, a compact disc, a minidisc, a digital versatile disk (DVD) and a drive device thereof, and further any storage element or memory to be used in future may be applicable to the memory 83.

The configuration for implementing each of the functions of the driving load calculator 2, etc., using one of the hardware and the software, etc., is described above. However, the configuration is not limited to such but part of the driving load calculator 2, etc., may be implemented by dedicated hardware, and another part thereof may be implemented by software. For example, a processing circuit functioning as the dedicated hardware can implement the functions of the driving load calculator 2, and the processing circuit 81 functioning as the processor 82 can implement the functions of the others through reading and executing a program stored in the memory 83.

As described above, the processing circuit 81 can implement each of the functions by hardware, software, etc., or any combinations of these.

Figure 17:
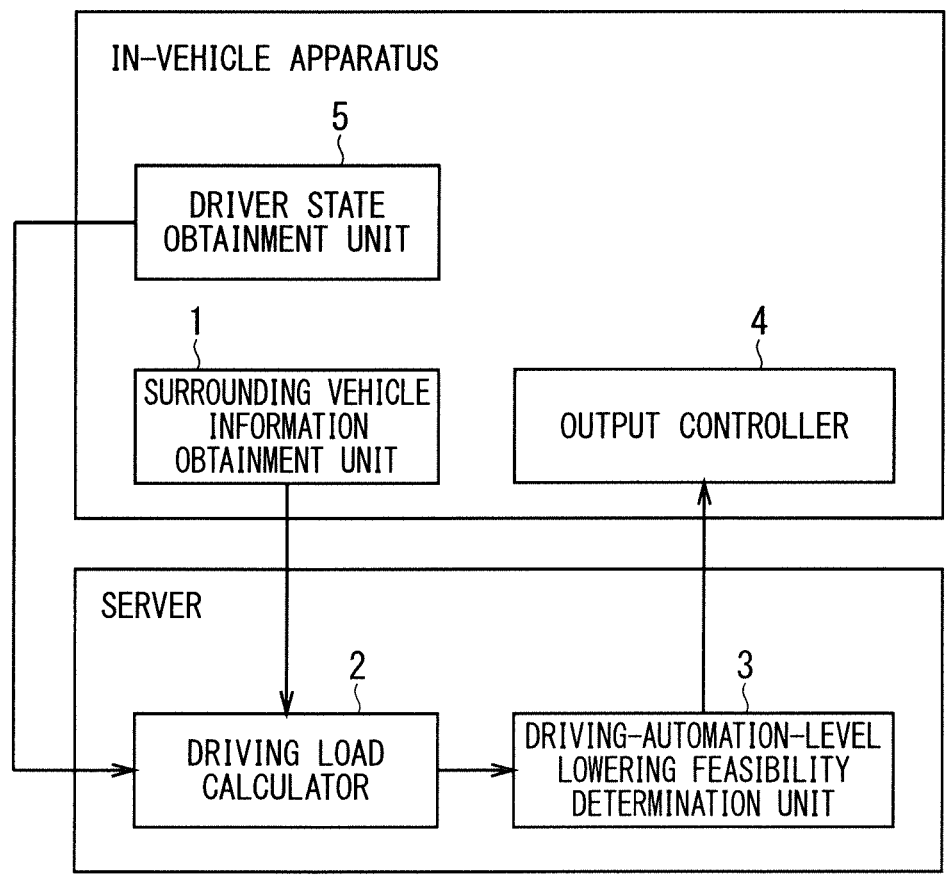
FIG. 17 illustrates an example configuration of the driving-automation-level lowering feasibility determination apparatus according to Embodiment 2 of the present invention with an in-vehicle apparatus and a server.

Although the driving-automation-level lowering feasibility determination apparatuses 101 and 102 are described as in-vehicle apparatuses above, they are applicable to a system to be built by appropriately combining, for example, an in-vehicle apparatus, a portable navigation device, a communication terminal (e.g., a mobile phone, smartphone, or a mobile terminal such as a tablet), functions of applications to be installed in these, and a server. The functions and the constituent elements of the driving-automation-level lowering feasibility determination apparatuses 101 and 102 described above may be dispersively allocated to each device for building the driving-automation-level lowering feasibility determination apparatuses 101 and 102 or allocated to any one of the devices in a centralized manner. As illustrated in FIG. 17, for example, the surrounding vehicle information obtainment unit 1, the output controller 4, and the driver state obtainment unit 5 may be disposed in an in-vehicle apparatus, whereas the driving load calculator 2 and the driving-automation-level lowering feasibility determination unit 3 may be disposed in a server, in the configuration of the driving-automation-level lowering feasibility determination apparatus 102.

Embodiments of the present invention can be freely combined, and appropriately modified or omitted within the scope of the invention.

Although the present invention is described in detail, the foregoing description is in all aspects illustrative and does not restrict the invention. It is therefore understood that numerous modifications and variations that have not yet been exemplified can be devised without departing from the scope of the invention.

EXPLANATION OF REFERENCE SIGNS 1 surrounding vehicle information obtainment unit, 2 driving load calculator, 3 driving-automation-level lowering feasibility determination unit, 4 output controller, 5 driver state obtainment unit, 11 automated driving control device, 12 communication unit, 13 in-vehicle sensor, 14 camera, 15 millimeter wave radar, 16 ultrasonic sensor, 18 driver state detector, 19 display, 30 subject vehicle icon, 31 bar, 50 subject vehicle, 52, 53, 54 surrounding vehicle, 55 server, 81 processing circuit, 82 processor, 83 memory, 101, 102 driving-automation-level lowering feasibility determination apparatus.

The invention claimed is:

1. A driving-automation-level lowering feasibility determination apparatus, comprising:
a processor to execute a program; and
a memory to store the program which, when executed by the processor, performs processes of:
obtaining surrounding vehicle information that is information on a surrounding vehicle traveling around a subject vehicle in which an automated driving controller switches between a plurality of driving automation levels to perform automated driving control;
calculating, based on a sum of a plurality of parameters associated with the surrounding vehicle information and the subject vehicle, a driving load value indicating a magnitude of a driving load on the subject vehicle;
determining feasibility of lowering one of the driving automation levels of the subject vehicle, based on the driving load value in comparison to a threshold value; and
outputting, to the automated driving controller, a result of the feasibility determined,
wherein the surrounding vehicle information includes density of a plurality of surrounding vehicles including the surrounding vehicle, the density being equal to the number of the surrounding vehicles located within a fixed distance from the subject vehicle, and wherein the surrounding vehicle information includes a driving automation level of the surrounding vehicle, and the driving load value is calculated to be more increased as the driving automation level of the surrounding vehicle is lower and to be more decreased as the driving automation level of the surrounding vehicle is higher.

2. The driving-automation-level lowering feasibility determination apparatus according to claim 1,
wherein the surrounding vehicle information includes a behavior of the surrounding vehicle.

3. The driving-automation-level lowering feasibility determination apparatus according to claim 1,
wherein the surrounding vehicle information includes attribute information of a driver of the surrounding vehicle.

4. The driving-automation-level lowering feasibility determination apparatus according to claim 1,
wherein the surrounding vehicle information includes a vehicle type of the surrounding vehicle.

5. The driving-automation-level lowering feasibility determination apparatus according to claim 3,
wherein the attribute information of the driver of the surrounding vehicle includes at least one of a driving history, age, or a driving record.

6. The driving-automation-level lowering feasibility determination apparatus according to claim 1,
wherein the driving load value is calculated based on at least one of a behavior of the subject vehicle or characteristics on a traveling route of the subject vehicle, in addition to the surrounding vehicle information.

7. The driving-automation-level lowering feasibility determination apparatus according to claim 1,
wherein the driving load value is calculated based on a psychological or physiological state of a driver of the subject vehicle, in addition to the surrounding vehicle information.

8. A driving-automation-level lowering feasibility determination apparatus, comprising:
a processor to execute a program; and
a memory to store the program which, when executed by the processor, performs processes of:
obtaining surrounding vehicle information that is information on a surrounding vehicle traveling around a subject vehicle in which an automated driving controller switches between a plurality of driving automation levels to perform automated driving control;
calculating, based on a sum of a plurality of parameters associated with the surrounding vehicle information and the subject vehicle, a driving load value indicating a magnitude of a driving load on the subject vehicle;
determining feasibility of lowering one of the driving automation levels of the subject vehicle, based on the driving load value in comparison to a threshold value; and
outputting, to the automated driving controller, a result of the feasibility determined,
wherein the surrounding vehicle information includes density of a plurality of surrounding vehicles including the surrounding vehicle, the density being equal to the number of the surrounding vehicles located within a fixed distance from the subject vehicle, and
the driving load value is calculated so that the driving load value in the presence of a surrounding vehicle having no communicator capable of inter-vehicle communications is higher than the driving load value in the absence of the surrounding vehicle.

* * * * *